(12) United States Patent
Hilditch et al.

(10) Patent No.: US 6,173,308 B1
(45) Date of Patent: Jan. 9, 2001

(54) DEADLOCK DETECTION MECHANISM FOR DATA PROCESSING SYSTEM, WITH DOUBLECHECKING TO CONFIRM THAT DETECTED DEADLOCK IS NON-SPURIOUS

(75) Inventors: Albert Stephen Hilditch, Wokingham; Steve Robert Pettifer, Burnage; Colin Michael Thomson, Congleton; Nasser Siddiqi, Rusholme, all of (GB)

(73) Assignee: International Computers Limited, London (GB)

( * ) Notice: Under 35 U.S.C. 154(b), the term of this patent shall be extended for 0 days.

(21) Appl. No.: 08/567,354

(22) Filed: Nov. 15, 1995

(30) Foreign Application Priority Data

Dec. 7, 1994 (GB) .................................................. 9424699

(51) Int. Cl.⁷ ...................................................... G06F 9/00
(52) U.S. Cl. ........................... 709/106; 709/104; 709/102
(58) Field of Search ............................. 395/671, 183.07, 395/181, 680; 709/100, 101, 102, 103, 104, 105, 106, 107; 710/20, 268, 200, 105, 107, 108, 126, 128; 712/28, 219

(56) References Cited

U.S. PATENT DOCUMENTS 5,459,871 * 10/1995 Van Den Berg ..................... 395/650

\* cited by examiner

*Primary Examiner*—Majid Banankhah
(74) *Attorney, Agent, or Firm*—Lee, Mann, Smith, McWilliams, Sweeney & Ohlson

(57) ABSTRACT

A distributed data processing system has a deadlock detection mechanism for detecting a potential deadlock involving a cyclic chain of dependencies between transactions. The system also has a deadlock doublechecking mechanism for confirming that all the dependencies in the potential deadlock chain are co-existent. If deadlock is confirmed, action is taken to break the deadlock. The deadlock doublechecking mechanism operates by marking the dependencies in the cyclic chain with a unique existence number, and subsequently checking that the existence number of each dependency in the cyclic chain is unchanged. Marking the dependencies may be performed by propagating a probe message, containing a unique probe existence number, and associating this probe existence number with each dependency visited by said marker probe.

9 Claims, 3 Drawing Sheets

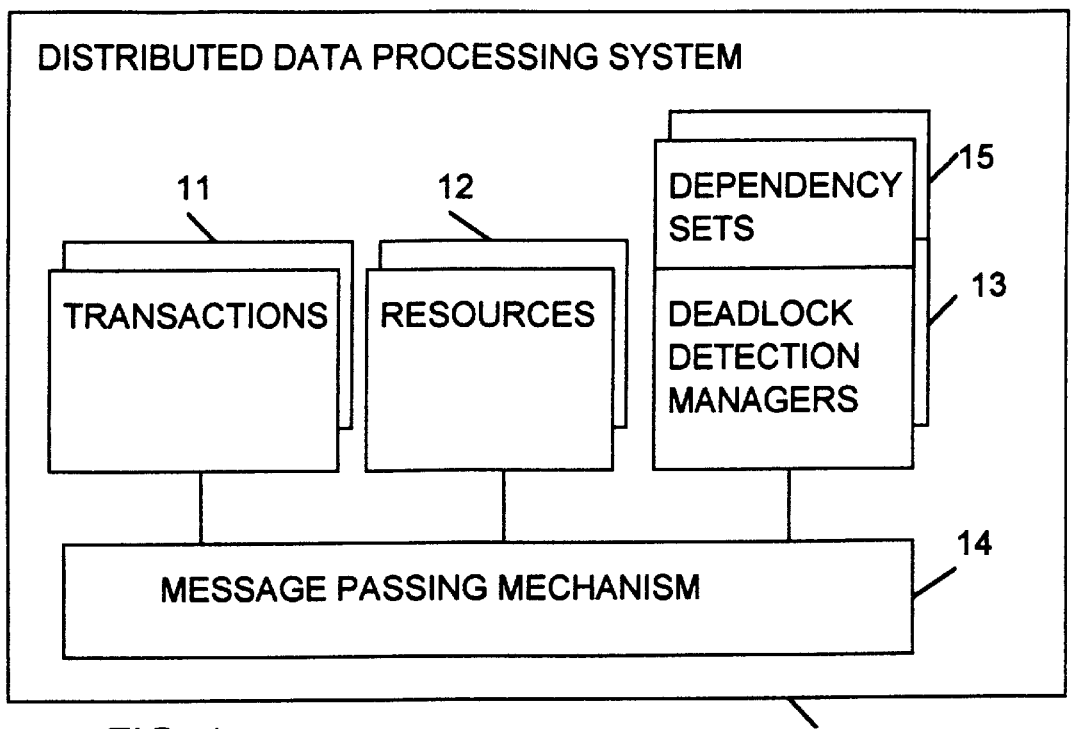
FIG. 1
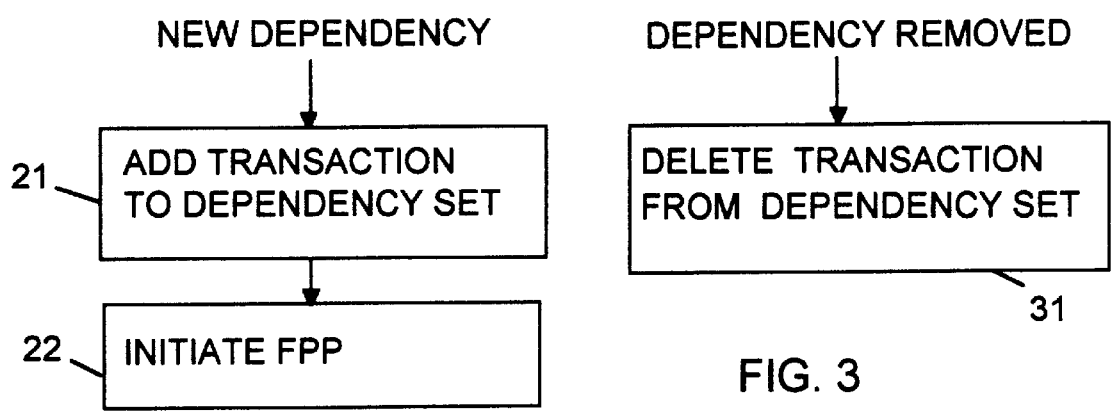
FIG. 2
FIG. 3

DEADLOCK DETECTION MECHANISM FOR DATA PROCESSING SYSTEM, WITH DOUBLECHECKING TO CONFIRM THAT DETECTED DEADLOCK IS NON-SPURIOUS

BACKGROUND TO THE INVENTION

This invention relates to deadlock detection mechanisms for distributed data processing systems.

In a database system it is common to increase performance by allowing multiple transactions to execute concurrently. In order to ensure data consistency, a transaction must lock a data resource before accessing it and unlock it afterwards, and transactions must conform to the two-phase locking protocol. Two-phase locking means that a transaction must take all of its locks before it can release any of its locks (the first phase consists of taking locks, the second phase of releasing locks).

Locking introduces dependencies between transactions: that is, one transaction may be waiting for another transaction to release a lock before it can proceed. If a cyclic chain of dependencies occurs, all the transactions in the chain will be held up, each waiting for another; this is referred to as a deadlock. A mechanism must therefore be provided to detect deadlocks, and to perform appropriate action to break a detected deadlock. This action may involve selecting one of the deadlocked transactions as a victim, and aborting it. Deadlock detection is sometimes performed by a database management system back-end and sometimes by a platform-specific program.

Deadlock detection mechanisms are sometimes called upon to detect forms of deadlock other than that created by data resource locking. In these cases, the two-phase locking protocol may not be followed. The fact that modern database management system backends are multi-threaded means that a transaction might take and release a lock a number of times during its execution. This may cause spurious deadlocks to be detected by conventional deadlock detection mechanisms.

The object of the present invention is to provide a deadlock detection mechanism which enables such spurious deadlocks to be avoided.

SUMMARY OF THE INVENTION

According to the invention, there is provided a distributed data processing system comprising:

(a) initial deadlock detection means for detecting a potential deadlock involving a cyclic chain of dependencies between a plurality of entities (e.g. transactions) in the system;

(b) deadlock doublechecking means, responsive to detection of a potential deadlock, for confirming that all the dependencies in said cyclic chain are co-existent; and (c) deadlock resolution means responsive to confirmation that all the dependencies in said cyclic chain are co-existent, for performing an action to break said deadlock.

It can be seen that the present invention provides a deadlock detection mechanism which double-checks whether entity dependencies in a possible deadlock all exist concurrently. The present invention therefore avoids the possibility of falsely detecting deadlock in the case when entities do not necessarily follow the two-phase locking protocol.

BRIEF DESCRIPTION OF THE DRAWINGS

FIG. 1 is a block diagram of a distributed data processing system embodying the present invention. The system includes a deadlock detection mechanism comprising a number of deadlock detection managers (DDMs).

FIGS. 2 to 7 are flowcharts showing the operation of the DDMs.

DESCRIPTION OF AN EMBODIMENT OF THE INVENTION

Figure 4:
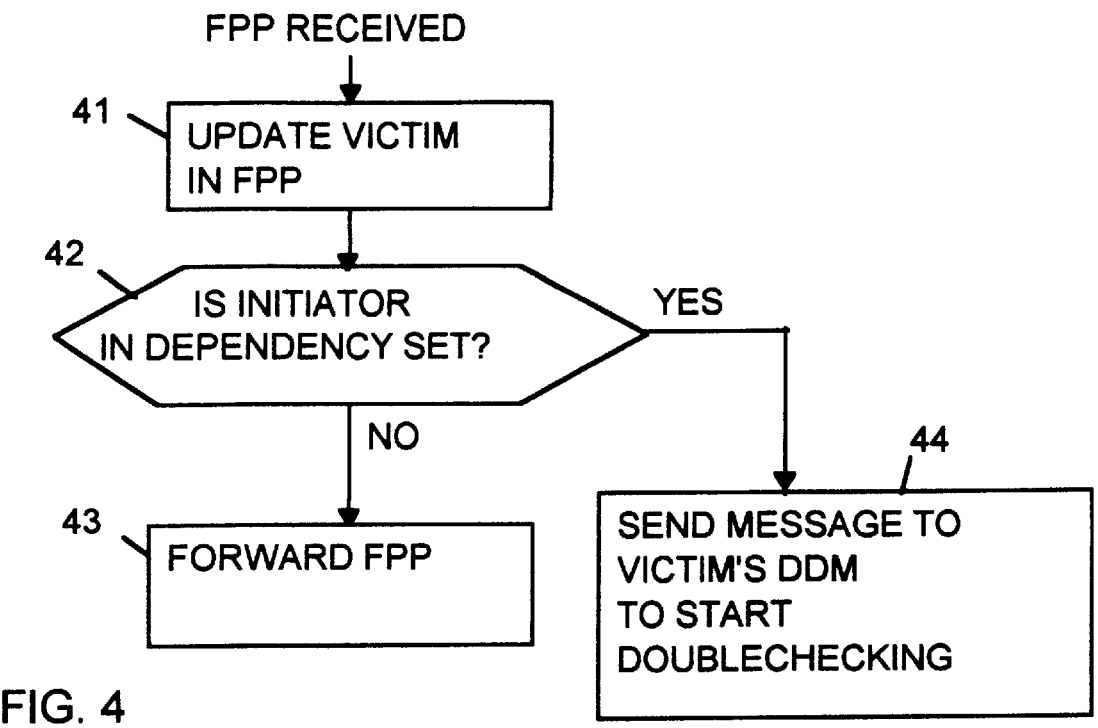

One embodiment of the invention will now be described by way of example with reference to the accompanying drawings.

Referring to FIG. 1, this shows a distributed data processing system 10. The system includes a number of transactions 11, which access data resources 12. In order to ensure data consistency, a transaction must lock a data resource before accessing it and unlock it afterwards. The system also includes a deadlock detection mechanism comprising a plurality of deadlock detection managers (DDMs) 13, each associated with a particular transaction. The transactions, resources and DDMs communicate by way of a message passing mechanism 14.

Each DDM maintains a dependency set 15, comprising a list of transactions on which the DDM's associated transaction is dependent. Each member of the dependency set may have one or more unique probe existence numbers (PENs) associated with it. As will be shown, the PENs can be used to distinguish different instances of the same dependency from each other.

The deadlock detection mechanism needs to be informed of dependencies between the transactions. Each time a dependency is created between two transactions, a message is sent to the DDM of the waiting transaction to inform it of the name of the waited-for transaction. Similarly, each time a dependency is removed, a message is sent to the DDM of the waiting transaction to inform it of the name of the transaction upon which it is no longer dependent. As will be described, the DDMs use these messages to keep their dependency sets up-to-date. In addition, whenever a new dependency is created, the DDMs perform actions to detect possible deadlocks.

Each transaction has a significance value associated with it, dependent on its existence time: the older the transaction, the greater its significance. If transactions are named (numbered) sequentially in the order in which they are created, the significance value of each transaction may be derived as a simple function of its name.

The operation of the deadlock detection mechanism will now be described with reference to FIGS. 2–7. The mechanism uses special messages referred to herein as probes. Three types of probe are used, referred to as first, second and third phase probes. These different probe types are distinguished by different headers.

Referring to FIG. 2, this shows the operation of a DDM when it receives a message indicating a new dependency.

(Box 21) First, the DDM adds the name of the waited-for transaction to its dependency set. No PEN is associated with the dependency at this stage.

(Box 22) The DDM then initiates a first phase probe (FPP), sending it to the DDM of the waited-for transaction. An FPP contains two pieces of information: the name of the initiating transaction (i.e. the transaction whose DDM initiated the FPP) and the name of a proposed victim (i.e. the transaction to be aborted if deadlock is detected). The proposed victim is the least significant transaction so far visited by the probe: initially, it is the initiating transaction.

Referring to FIG. 3, this shows the operation of a DDM when it receives a message indicating that its associated transaction is no longer dependent on another. As shown in box 31, the DDM deletes the waited-for transaction from its dependency set (including any associated existence number). No further action is taken.

Referring to FIG. 4, this shows the operation of a DDM when it receives a first phase probe (FPP).

(Box 41) The DDM first compares the significance of its transaction with the significance of the proposed victim. If the significance of the DDM's transaction is lower than that of the proposed victim, the DDM substitutes its transaction into the FPP as the proposed victim. The initiating transaction in the FPP is not changed.

(Box 42) The DDM then checks to see if the initiating transaction of the FPP is a member of its dependency set.

(Box 43) If the initiating transaction of the FPP is not in the DDM's dependency set, the DDM then forwards the FPP to the DDMs of all the members of its dependency set. If there are no transactions in the dependency set the FPP is discarded.

(Box 44) If the initiating transaction of the received FPP is present in the DDM's dependency set, this means that there is a cyclic chain of dependencies, and hence a potential deadlock. This deadlock may, however, be spurious, if all the dependencies in the cycle are not concurrent. The DDM therefore sends a message to the DDM of the proposed victim, requesting it to initiate deadlock doublechecking.

Figure 5:
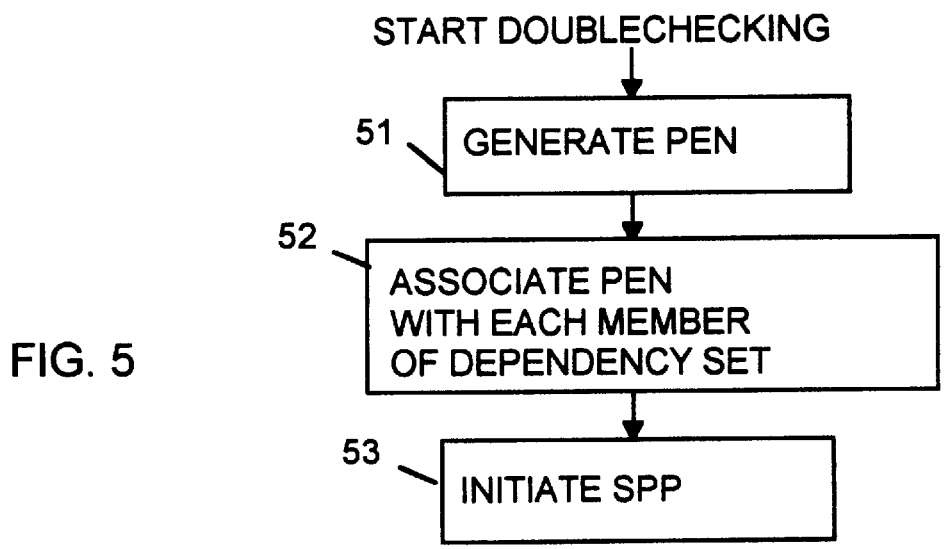

Referring to FIG. 5, this shows the operation of a DDM when it receives a message requesting it to initiate deadlock doublechecking. When the DDM receives this message, it knows that its transaction is the proposed victim.

(Box 51) The DDM first generates a new probe existence number (PEN). Each DDM generates PENs using its own private counter, which it increments each time it generates a PEN. Each PEN also contains the name of the DDM that generated it. Hence, each PEN is unique throughout the system.

(Box 52) The DDM associates the newly generated PEN with each of the members of its dependency set. It should be noted that the new PEN is added to any PENs already associated with the dependency set.

Figure 6:
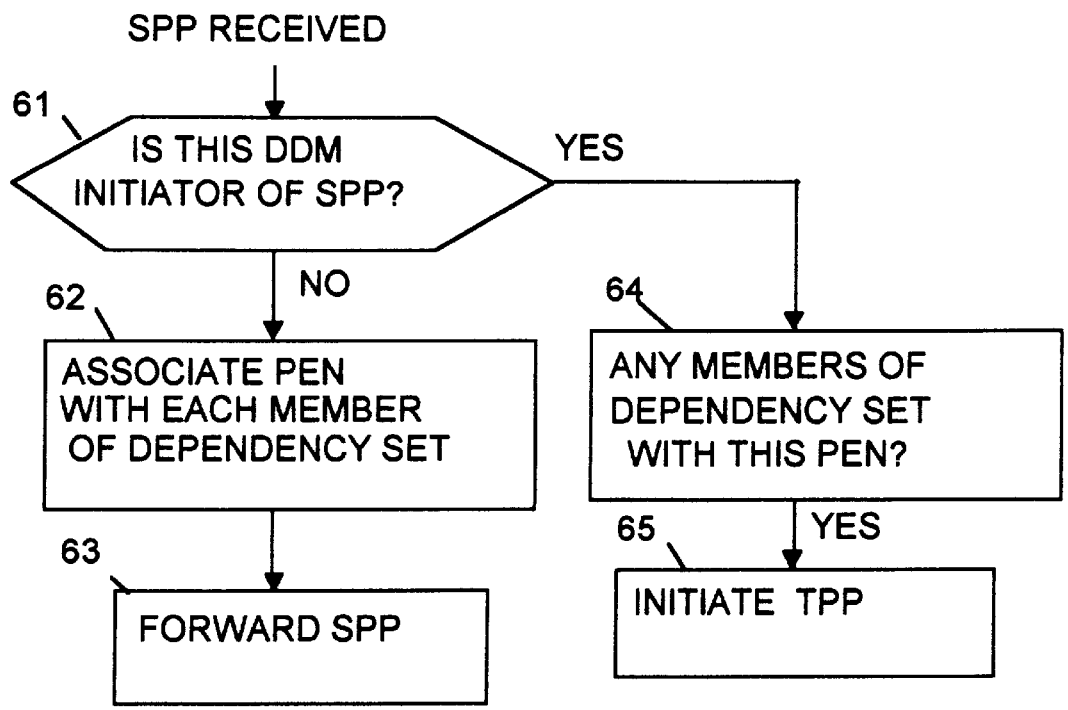

(Box 53) The DDM then initiates a second phase probe (SPP), sending it to the DDM of each member of its dependency set. Each SPP includes two parameters: the name of the initiating transaction (i.e. the proposed victim) and the PEN. Referring to FIG. 6, this shows the operation of a DDM when it receives an SPP.

(Box 61) The DDM first checks to see if it initiated the SPP.

(Box 62) If the DDM did not initiate the SPP, it associates the probe existence number (PEN) in the SPP with each of the members of its dependency set. It should be noted that the PEN is added to any PENs already associated with the dependency set. Thus, each member of the dependency set will have a PEN associated with it for each SPP initiated or received while that member exists in the dependency set.

(Box 63) The DDM then forwards the SPP to the DDMs of all the members of its dependency set.

(Box 64) If the DDM initiated the SPP, it compares the PEN in the SPP with the PENs associated each of the members of the DDM's dependency set. If the PEN in the SPP does not match any of the PENs in the dependency set, no further action is taken.

(Box 65) If the PEN in the SPP matches at least one of the PENs in the dependency set, the DDM then initiates a third phase probe (TPP). The TPP is sent to the DDM of each member of the dependency set having a matching PEN. The TPP contains the same information as the SPP. In order to be able to distinguish between multiple TPPs that may be sent when more than one copy of an SPP returns (because of multiple cyclic chains of dependencies), the TPPs associated with any given SPP are assigned different third phase existence numbers (TPENs), which are appended to the TPPs. Each DDM remembers the latest TPEN generated by it.

Figure 7:
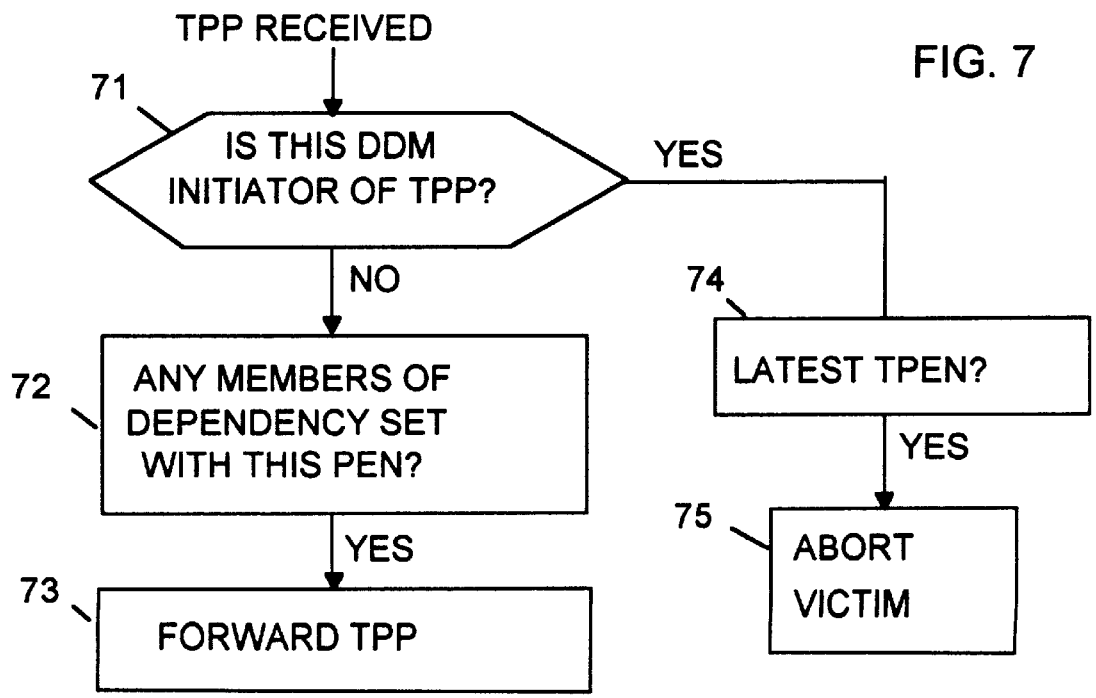

Referring to FIG. 7, this shows the operation of a DDM when it receives a TPP.

(Box 71) The DDM first checks to see if it initiated the TPP.

(Box 72) If the DDM was not the initiator, the DDM compares the PEN in the TPP with the PENs associated each of the members of the DDM's dependency set. If the PEN in the TPP does not match any of the PENs in the dependency set, no further action is taken.

(Box 73) If the PEN in the TPP matches at least one of the PENs in the dependency set, the TPP is then forwarded to the DDM of each member of the dependency set having a matching PEN.

(Box 74) If the TPP has arrived back at its initiator, the TPEN in the TPP is checked to see whether it is the latest TPEN to have been generated by this DDM. If it is not the latest TPEN, no further action is taken. Thus, where further copies of an SPP arrive after a TPP is sent, that TPP is ignored. This avoids a potential race condition that can occur if several TPPs are generated for the same deadlock.

(Box 75) If the TPEN is the latest TPEN, deadlock is confirmed and a message is sent out of the deadlock detection mechanism to abort the victim, so as to break the deadlock.

In summary, it can be seen that the deadlock detection mechanism described above operates in three phases. In a first phase, a cyclic chain of dependencies is traced, to detect a potential deadlock; however, this deadlock may be spurious, since it may involve dependencies that do not exist concurrently. In a second phase, the cyclic chain of dependencies is traced again, and the dependencies in the chain are labelled with a unique probe existence numbers (PEN). Then, in a third phase, the cyclic chain of dependencies is traced again, to check whether the cycle still exists, and whether the dependencies in that cycle still have the same PEN. If so, it is concluded that the dependencies all exist concurrently, and so action is taken to break the deadlock.

Some Possible Modifications

It will be appreciated that many modifications may be made to the system described above without departing from the scope of the present invention.

For example, other deadlock detection mechanisms may be used in the first phase to detect potential deadlocks. Thus, while the deadlock detection mechanism illustrated in FIGS. 2 to 4 is a "probe forgetting" mechanism in which copies of probes are not retained in the DDMs, a "probe remembering" mechanism, such as described, for example, in our copending European patent application EP 93306677 could equally well be used.

Also, instead of aborting transactions, other methods may be used to break deadlocks. For example, one of the transactions in the deadlock cycle may be forced to release a lock, as described in the above-mentioned patent application.

Although in the embodiment described above each DDM manages just a single transaction, it will be appreciated that it is equally possible for each DDM to manage a number of separate transactions. In this case, each DDM would maintain a number of dependency sets, one for each transaction managed by it.

In the above description, a mechanism has been described for detecting deadlocks between transactions. However, it will be appreciated that the invention is equally applicable to detecting deadlocks between other types of entity.

In another possible modification, it would be possible to combine the functions of the first and second phase probes, by adding the PENs in the initial deadlock detection phase, rather than in a separate second phase. However, for performance reasons, it is considered preferable to keep the initial deadlock detection phase as simple as possible, and to add the PENs in a separate second phase, as described above. Suspected deadlock will occur only in a fraction of cases, and hence the overhead of the extra phase is not significant.

In yet another possible modification, instead of using PENs, each dependency in the potential deadlock cycle may be marked with a unique dependency existence number (DEN), generated locally by the DDM. In this case, deadlock may be confirmed by accumulating a list of the DENs in the SPP, and then circulating this list in the TPP, and checking that none of the DENs has changed.

What is claimed is:

1. A distributed data processing system comprising:
   (a) initial deadlock detection means for detecting a potential deadlock involving a cyclic chain of dependencies between a plurality of entities in the system;
   (b) deadlock doublechecking means, responsive to detection of a potential deadlock by said initial deadlock detection means, for confirming that all the dependencies in said cyclic chain are co-existent; and
   (c) deadlock resolution means responsive to confirmation by said deadlock doublechecking means that all the dependencies in said cyclic chain are co-existent, for performing an action to break said deadlock.

2. A system according to claim 1 wherein said deadlock doublechecking means comprises:
   (a) marking means for generating a unique existence number and for marking all the dependencies in said cyclic chain with said unique existence number; and
   (b) checking means for subsequently checking that all the dependencies in said cyclic chain have the same existence number.

3. A system according to claim 1 wherein said initial deadlock detection means comprises:
   (a) a plurality of dependency sets, one for each said entity, each dependency set comprising a number of dependency members representing dependencies upon other entities; and
   (b) means for tracing a cyclic chain of dependencies between said dependency sets.

4. A system according to claim 3 wherein said deadlock doublechecking means comprises:
   (a) means for propagating a marker probe around said cyclic chain, said marker probe containing a unique probe existence number, and associating said probe existence number in the marker probe with each dependency member in each dependency set visited by said marker probe; and
   (b) means for propagating a checking probe around said cyclic chain, said checking probe containing said probe existence number, and checking that at least one the dependency member in each dependency set visited by the checking probe still has the same said probe existence number associated with it.

5. A system according to claim 4 wherein each said checking probe also includes a further existence number, for distinguishing multiple checking probes that may be generated if multiple copies of the same marking probe are received, and wherein a checking probe that has propagated around said cyclic chain is ignored if its further existence number is not the latest further existence number so far issued in respect of a given marking probe.

6. A method of handling deadlocks in a distributed data processing system, the method comprising:
   (a) detecting a potential deadlock involving a cyclic chain of dependencies between a plurality of entities in the system;
   (b) upon detection of a potential deadlock, confirming that all the dependencies in said cyclic chain are co-existent; and
   (c) upon confirmation that all the dependencies in said cyclic chain are co-existent, performing an action to break said deadlock.

7. A method according to claim 6 wherein step of confirming that all the dependencies in said cyclic chain are co-existent comprises:
   (a) generating a unique existence number, and marking all the dependencies in said cyclic chain with said unique existence number; and
   (b) subsequently checking that all the dependencies in said cyclic chain have the same existence number.

8. A method according to claim 6 wherein the step of detecting a potential deadlock comprises:
   (a) storing a plurality of dependency sets, one for each said entity, each dependency set comprising a number of dependency members representing dependencies upon other entities; and
   (b) tracing a cyclic chain of dependencies between said dependency sets.

9. A method according to claim 9 wherein the step of confirming that all the dependencies in said cyclic chain are co-existent comprises:
   (a) propagating a marker probe around said cyclic chain, said marker probe containing a unique probe existence number, and associating said probe existence number in the marker probe with each dependency member in each dependency set visited by said marker probe; and
   (b) propagating a checking probe around said cyclic chain, said checking probe containing said probe existence number, and checking that at least one the dependency member in each dependency set visited by the checking probe still has the same said probe existence number associated with it.

* * * * *